United States Patent
Ikuno et al.

(10) Patent No.: US 8,482,754 B2
(45) Date of Patent: Jul. 9, 2013

(54) PROVIDING A PLURALITY OF PROCESSING UNITS FOR AN IMAGE FORMING APPARATUS

(75) Inventors: Takao Ikuno, Yokohama (JP); Fumio Shoji, Komae (JP); Masahiro Odaira, Kawasaki (JP); Yoshiaki Katahira, Yokohama (JP); Toru Fujino, Kawaguchi (JP); Yasuhito Niikura, Matsudo (JP); Kenji Kasuya, Yokohama (JP); Noritsugu Okayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/598,513

(22) PCT Filed: Mar. 1, 2005

(86) PCT No.: PCT/JP2005/003824
§ 371 (c)(1),
(2), (4) Date: Nov. 5, 2007

(87) PCT Pub. No.: WO2005/086470
PCT Pub. Date: Sep. 15, 2005

(65) Prior Publication Data
US 2008/0204768 A1 Aug. 28, 2008

(30) Foreign Application Priority Data
Mar. 3, 2004 (JP) ................................ 2004-059232

(51) Int. Cl.
*G06F 3/12* (2006.01)
(52) U.S. Cl.
USPC ........................................................ 358/1.15
(58) Field of Classification Search
USPC .............................................. 358/1.13, 1.15
See application file for complete search history.

(56) References Cited

U.S. PATENT DOCUMENTS

| | | | |
|---|---|---|---|
| 5,574,834 A | 11/1996 | Horie et al. | 395/114 |
| 5,787,239 A | 7/1998 | Horie et al. | 395/114 |
| 5,943,508 A * | 8/1999 | Penney et al. | 710/51 |
| 6,587,735 B1 * | 7/2003 | Yaguchi | 700/2 |
| 2004/0067739 A1 * | 4/2004 | Sim et al. | 455/101 |
| 2005/0047666 A1 * | 3/2005 | Mitchell et al. | 382/233 |
| 2005/0057778 A1 | 3/2005 | Morikawa et al. | 358/296 |
| 2008/0028369 A1 * | 1/2008 | Sasaki et al. | 717/127 |

FOREIGN PATENT DOCUMENTS

| | | |
|---|---|---|
| JP | 6-291991 | 10/1994 |
| JP | 2001-27986 | 1/2001 |
| JP | 2003-298383 | 10/2003 |
| JP | 2005-72831 | 3/2005 |

* cited by examiner

*Primary Examiner* — Eric A Rust
(74) *Attorney, Agent, or Firm* — Fitzpatrick, Cella, Harper & Scinto (57) ABSTRACT

An image processing apparatus has a large number of image processing functions, in which resources necessary for code processing units can be suppressed while a large-scale decline in performance is prevented. The apparatus includes code processing units for executing coding and decoding of image data, and request-source task units (print function, scanner function and FAX transceive function), which request any one of the code converters to perform code conversion of image data. The number of request-source task units is greater than the number of code converters and a degree of priority has been set for each one. A determination unit always assigns the code converting units to processing requests from request-source task units having a high priority and, if there is an idle code converting unit, assigns the code converting unit to a processing request from a request-source task unit having a low priority.

13 Claims, 5 Drawing Sheets

PROVIDING A PLURALITY OF PROCESSING UNITS FOR AN IMAGE FORMING APPARATUS

TECHNICAL FIELD

This invention relates to an image processing apparatus for subjecting a digital image to encoding and decoding processing. More particularly, the invention relates to an image processing apparatus that is capable exploiting various image processing functions such as a scanner function, facsimile function and printer function.

BACKGROUND ART

In a conventional MFP (multifunction peripheral) apparatus, input image data is data that has been read in from a scanner, data that has been received by facsimile, etc., and output image data is image data that has been formed by a printer, image data transmitted by facsimile, etc.

Figure 1:
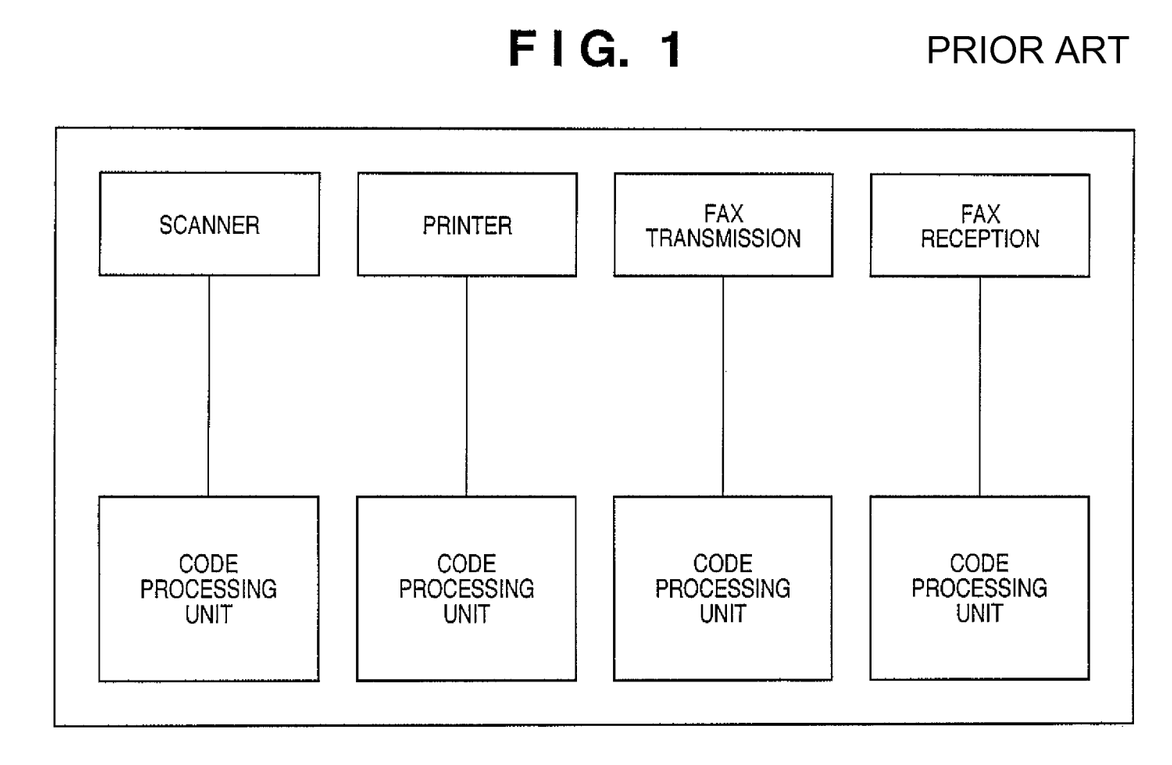
FIG. 1 is a diagram illustrating the concept of assigning code processing tasks in a conventional MFP apparatus.

In such an MFP apparatus, usually a dedicated code processing unit is provided for each image processing function. FIG. 1 illustrates the relationship (the assignment of code processing tasks) between the image processing functions and code processing units in such a conventional MFP apparatus.

As shown in FIG. 1, the image processing functions and code processing units are in one-to-one correspondence. In other words, the number of code processing units provided is equivalent to the number of image processing functions. Accordingly, the largest number of code processing units that can operate simultaneously are started up in multiplexed fashion, and if a processing request is issued, then processing is executed using the code processing unit that has been prepared.

This arrangement is such that if it is desired to request the code processing units to execute processing with regard to tasks classified by function, image encoding processing can always be executed using the code processing unit that has been assigned to its own function.

The reason why one code processing unit can thus be assigned to each function of all of the functions is that the number of image input/output paths is small and so is the number of resources required by one code processing unit.

With a modern MFP apparatus, however, the number of additional image processing functions is greater than before and the functions are more diverse. Consequently, it is difficult to provide code processing units for image processing functions in one-to-one correspondence. The reasons for this will now be described in detail.

The first reason is related to an increase in the number of image input/output paths of an MFP apparatus. Specifically, there has been an increase in the number of image input/output paths over that heretofore. For example, with regard to inputs, there are input paths for reading in files from a memory card, for receiving facsimile transmissions over the Internet, for receiving network files and for receiving e-mail, etc. With regard to outputs, there are output paths for transmitting facsimile documents over the Internet, for transmitting network files, for transmitting e-mail, for writing to an external memory card and for network scanning, etc.

Thus, there are too many functions to allow the maximum number of code processing units to operate function by function, and attempting to achieve this would use a large quantity of resources (in terms of memory capacity and excessive load upon the CPU).

The second reason is an increase in the amount of image code data processed. That is, the images processed now tend to be color images rather than monochrome, and resolution is higher than before. This results in an increase in the amount of code processed. As a consequence, it is necessary for one code processing unit to possess more resources than before, such as temporary buffers for processing.

Thus, there is an increase in amount of resources used by one code processing unit, and the number of code processing units that must be provided must also be increased. As a result, a very large quantity of resources becomes necessary, a memory of larger capacity and a CPU of high processing speed must be provided. This is disadvantageous in that it leads to a rise in apparatus cost.

Accordingly, an object of the present invention is to provide an image processing apparatus for exploiting resources in the apparatus to the maximum degree and making it possible to efficiently execute code processing corresponding to each image processing function.

DISCLOSURE OF INVENTION

According to the present invention, the foregoing object is attained by providing an image processing apparatus comprising: a plurality of code converting units for executing coding and decoding of image data; a plurality of request-source task units for requesting any of the plurality of code converting units to perform a code conversion of image data, the number of task units being greater than the number of code converting units and having priorities thereof set in advance; and an assigning unit for assigning the plurality of code converting units to processing requests from request-source task units having a high priority and, if there is an idle code converting unit among the plurality of code converting units, assigning the code converting unit to a processing request from a request-source task unit having a low priority.

Further, according to the present invention, there is provided an image processing method comprising: a processing-request issuing step of issuing a processing request to a code converting unit by any request-source task unit of a plurality of request-source task units the number of which is greater than the number of a plurality of code converting units and having priorities thereof set in advance, the code converting units executing coding and decoding of image data; a priority processing determination step of receiving the processing request and determining whether the processing request issued by the request-source task unit should be processed with priority; and an assigning step of assigning the code converting units to processing requests from request-source task units determined to have a high priority and, if there is an idle code processing unit among the code converting units, assigning the code processing unit to a processing request from a request-source task unit determined to have a low priority.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

The present invention relates to an image processing apparatus, and an MFP (multifunction peripheral) apparatus will be described as an example.

<Hardware Configuration>

Figure 2:
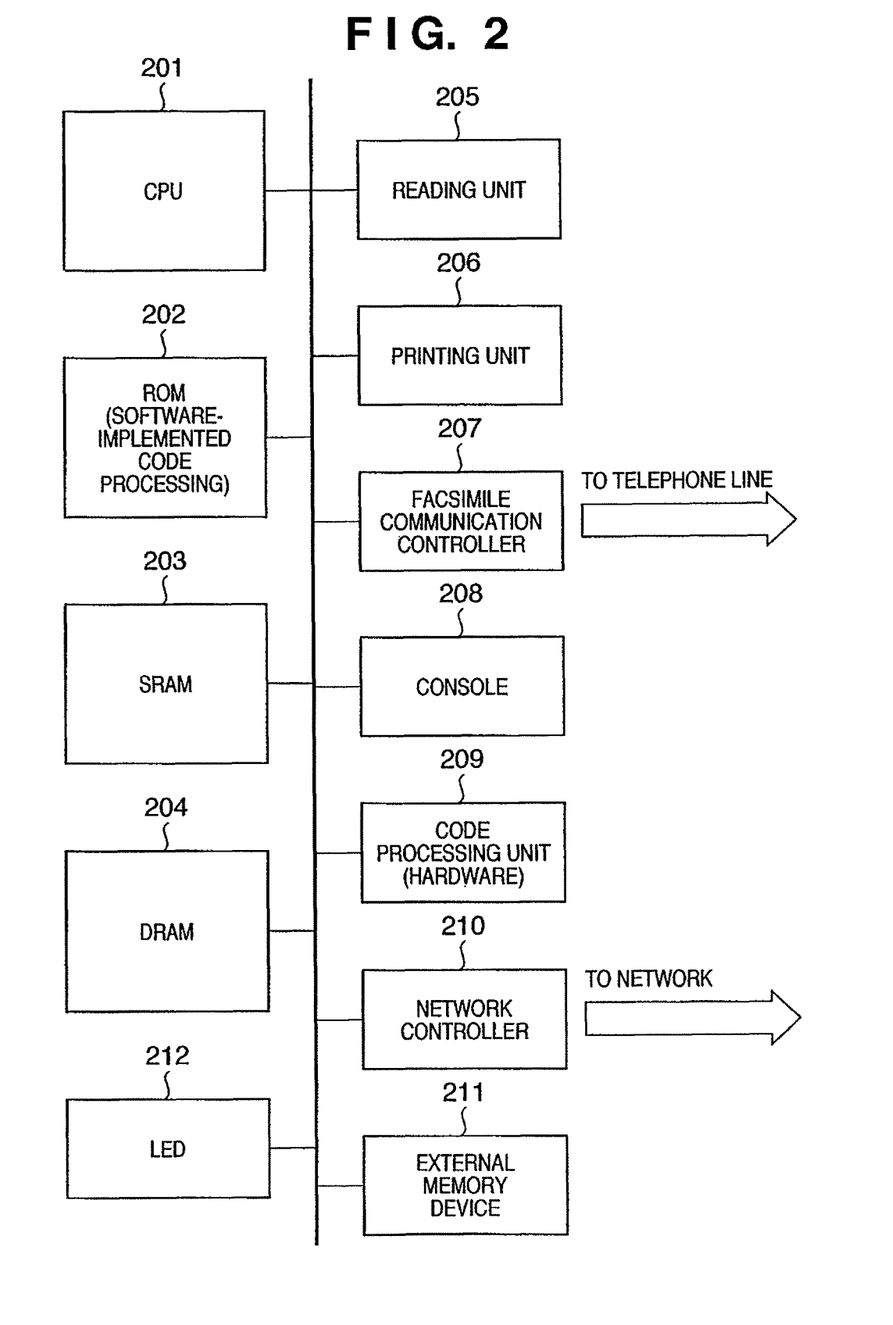
FIG. 2 is a diagram illustrating the hardware configuration of an MFP apparatus according to an embodiment of the present invention.

FIG. 2 is a diagram illustrating the hardware configuration of an MFP apparatus according to an embodiment of the present invention.

As shown in FIG. 2, the apparatus includes a CPU (Central Processing Unit) 201 for controlling the overall operation of the apparatus as a system controller. A ROM (Read-Only Memory) 202 stores the control program of the CPU 201. More specifically, the ROM 202 stores a program relating to software coding processing, described later. Examples of code processing schemes include JBIG, JPEG, binarization processing, MMR (Modified Modified Read), MR (Modified Read) and MH (Modified Huffman). The schemes are not limited to these.

An SRAM 203 is used to store set values registered by the operator and apparatus management data and includes various working buffers. A DRAM 204 is used to store program control variables and to accumulate image data and text data.

A reading unit (more specifically, a scanner) 205 is a device having a function for reading image data and converting it to binary data. A printing unit 206 has a printer function for outputting image data to printing paper.

A facsimile communication controller 207 is an interface for performing facsimile communication with a remotely installed facsimile apparatus via an external line such as a telephone line. A control console 208, which allows the operator to register information, includes operating buttons such as a numeric keypad and a touch-sensitive panel, etc.

A code processing unit (CODEC) 209 differs from the software code processing mentioned above and is implemented by a hardware chip. The reason for providing a hardware-implemented code processing unit in addition to software-implemented code processing in this embodiment is that hardware-implemented code processing has a much higher processing speed than software-implemented code processing. On the other hand, if a large number of chips for hardware-implemented code processing are provided, the cost and size of the overall apparatus increase. There is a limit, therefore, on the number of these chips that can be provided. The code processing unit 209 executes coding/decoding processing of image data handled by the communication controller 207 and processing for scaling images.

A network controller 210 has a function for interfacing a network line and is used to receive a print job and to send and receive documents via Internet facsimile. An external memory device 211 is a removable memory and includes an SD memory card, smart media, memory stick or compact flash (') disk.

An LED 212 has a function for notifying the operator that communication is in progress by turning on or turning off in a case where facsimile transceive or network communication is being performed.

<Assigning of Code Processing Tasks>

Figure 3:
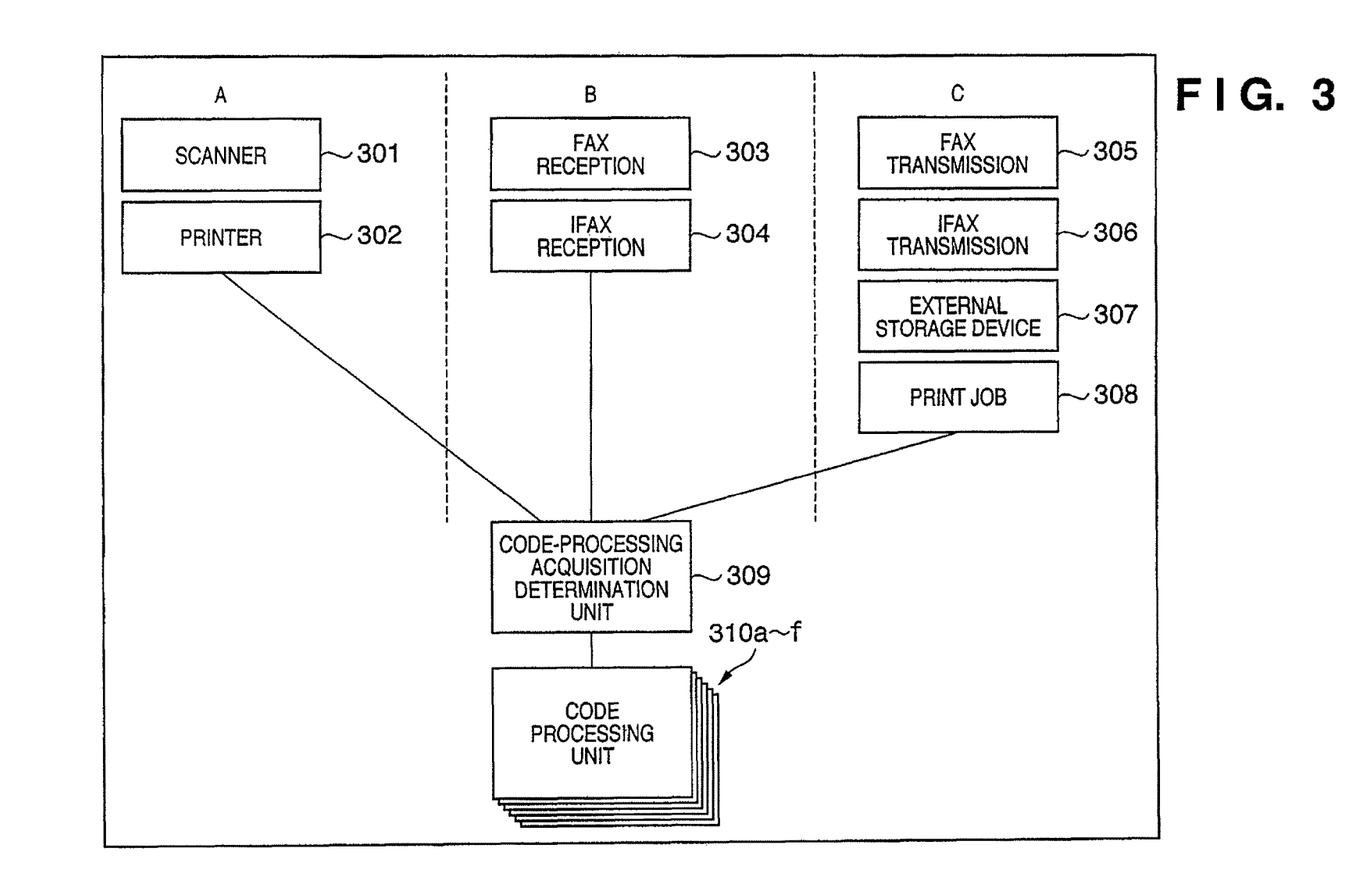
FIG. 3 is a diagram illustrating the concept of assigning code processing tasks in this embodiment.

FIG. 3 is a diagram illustrating the concept of a method of assigning code processing (software-implemented) tasks according to this embodiment.

In this embodiment, the functions of the MFP apparatus are divided into three groups when code processing is executed, as illustrated in FIG. 3.

Figure 4:
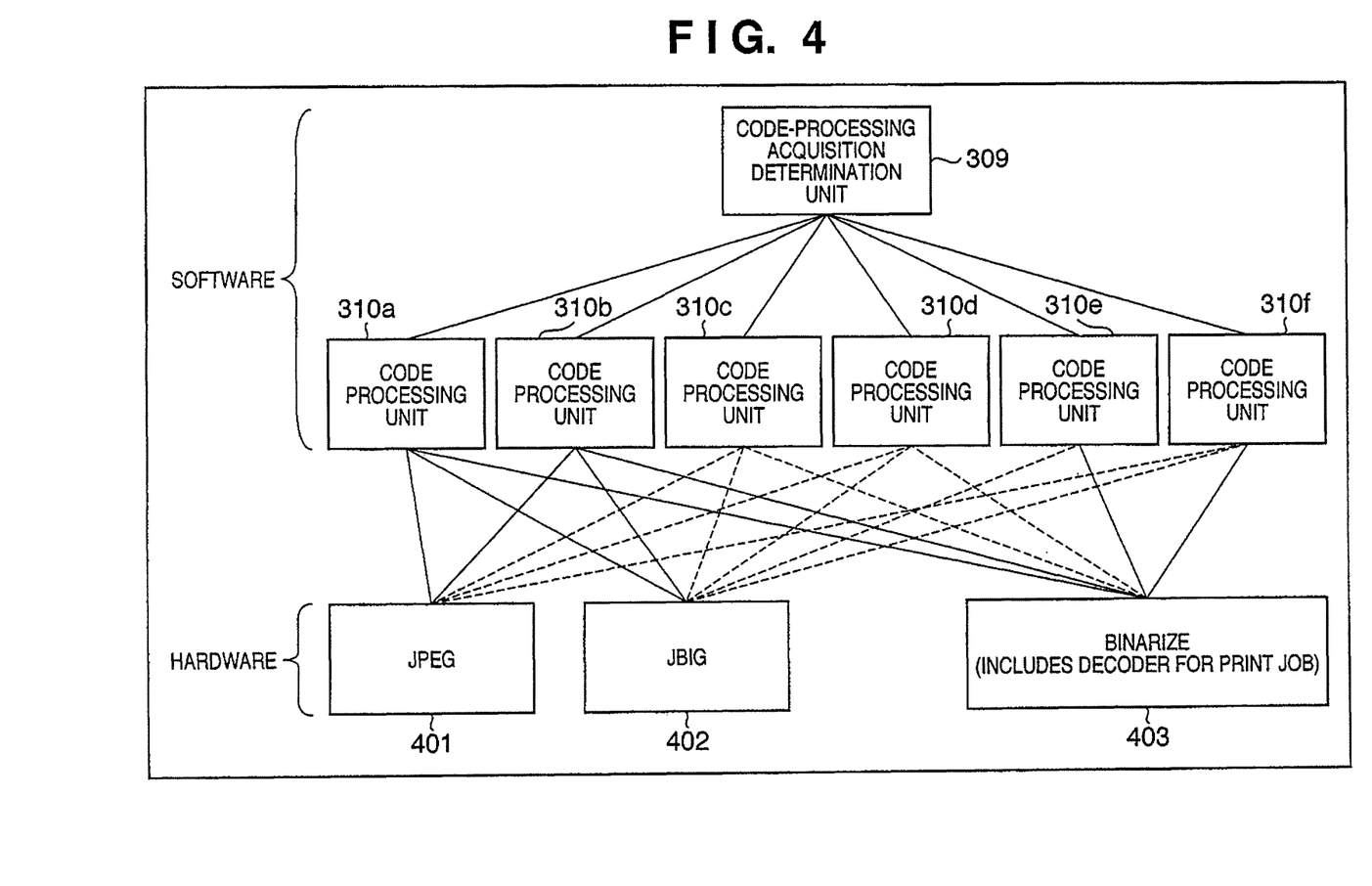
FIG. 4 is a diagram for describing the relationship between software-implemented code processing units and hardware-implemented code processing units.

A group A includes a scanner 301 and a printer 302 as functions. With regard to the functions included in this group, no particular problems arise in making processing wait. A characterizing feature, however, is that if processing has started, it is desired that the processing itself be completed quickly. Since the frequency of use of the function itself is high, the channels of code processing units 310 are provided fixedly and it is so arranged that one code processing unit can always be used if code processing of a corresponding function has been commanded. With reference to FIG. 4, data to be processed is sent to the hardware-implemented code processing unit 209 via the software-implemented code processing units 310 with regard to the functions included in this group, and the data is processed at high speed. As mentioned above, the functions of group A can be made to stand by but it is necessary to complete processing quickly once processing has begun.

A group B includes the functions of FAX reception 303 and IFAX reception 304. The functions included in group B are characterized in that if a receive request has been issued, the function must always respond immediately. A receive request from another transmitter cannot be made to wait. Accordingly, for the functions of group B as well, the channels of the software-implemented code processing units 310 are assigned fixedly in accordance with respective ones of the functions and it is so arranged that one code processing unit can always be used if code processing of a corresponding function has been commanded. It should be noted that since the functions included in group B must respond immediately if there is a receive request, the processing cannot be made to stand by. However, since it is unnecessary for the processing itself to be speeded up, unlike the case with group C, use of the hardware-implemented code processing unit 209 is not scheduled. This will be described later with reference to FIG. 4.

Group C includes FAX transmission 305, IFAX transmission 306, external storage device 307 and print job 308 as functions. A print job signifies processing for accepting a print request directed to the printer 302. The functions included in group C are characterized in that their frequency of use is low in comparison with the functions of group A, and in that start of processing can be made to wait longer in comparison with the functions of group B. In this embodiment, therefore, two software-implemented code processing units execute processing dynamically, that is, in order of decreasing earliness of the processing requests (i.e., in FIFO fashion), with regard to these four functions. It should be noted that with the exception of the print-job function 308, processing in this group is executed only by the software-implemented code processing units 310. The processing relating to the print-job function 308 is executed by the hardware-implemented code processing unit 209 via one software-implemented code processing unit 310 in a manner similar to that of the scanner 301 and printer 302. Thus, since only two code processing units are assigned to these four functions, the functions compete on a first-come, first-served based.

Figure 5:
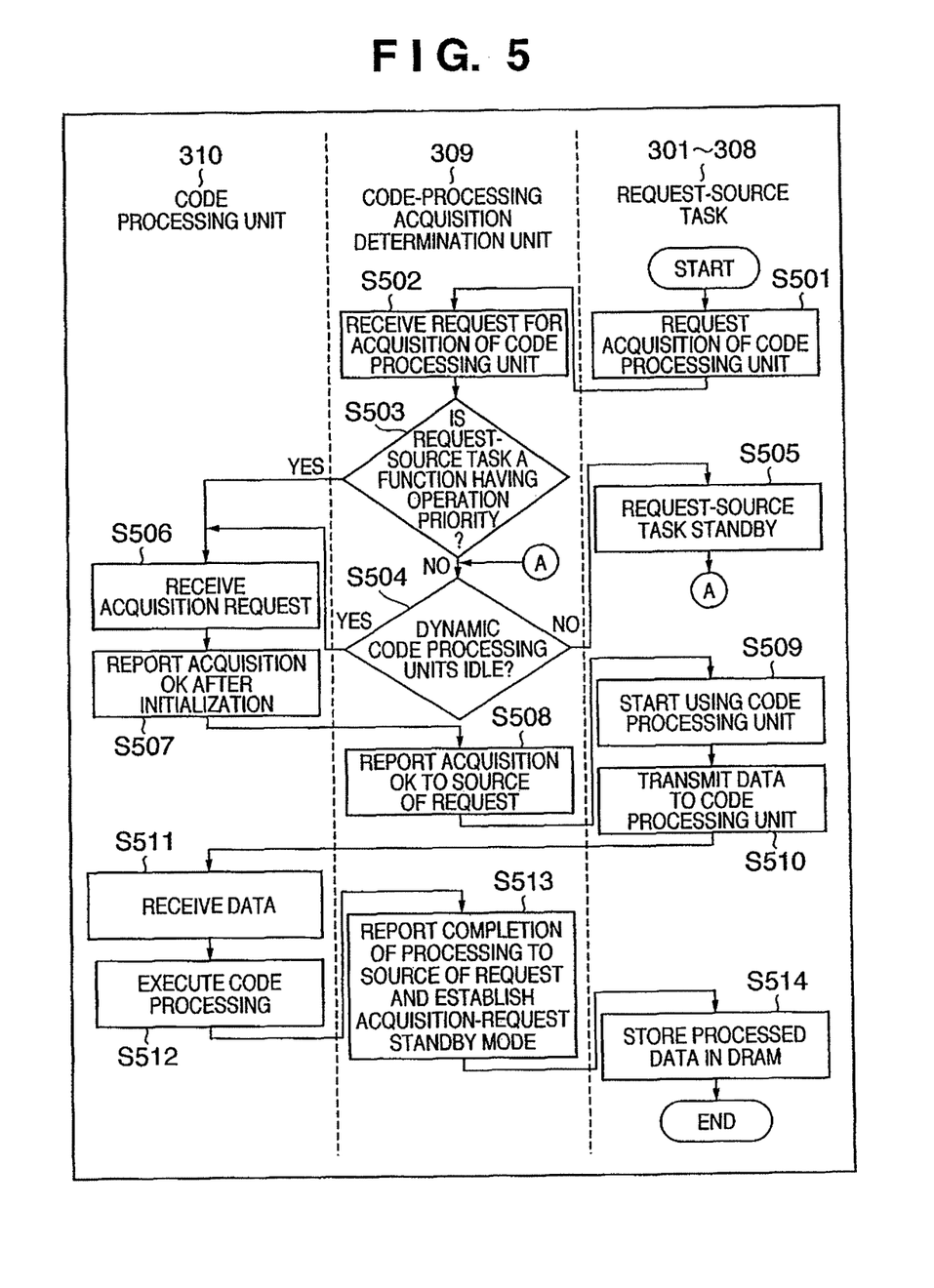
FIG. 5 is a flowchart for describing an assigning operation according to this embodiment.

A code-processing acquisition determination unit 309 executes assignment of processing in response to a task request in accordance with the processing of the flowchart shown in FIG. 5. The details will be described later with reference to FIG. 5.

Code processing units 310 (a to f) execute code processing corresponding to functions 301 to 308 based upon the software that has been stored in the ROM 202. In this embodiment, only six code processing units exist for eight functions. Processing units are assigned fixedly in one-to-one correspondence to the four functions 301 to 304. If a processing request has been issued, these software-implemented code processing units can operate immediately. However, only two code processing units are assigned to the four functions 305 to 308, and these two processing units are sought by these four function in the manner described above (in order of decreasing earliness of the processing requests).

For example, the code processing unit 310a executes coding and decoding processing corresponding to the scanner 301. The types of code processing corresponding to the scanner 301 are JBIG, JPEG and binarization, etc. The code processing unit 310b executes coding and decoding processing corresponding to the printer 302. The types of code processing corresponding to the printer 302 are JBIG, JPEG, binarization and text image processing for converting code sequences, which consists of numbers, to text.

The code processing unit 310c executes coding and decoding processing corresponding to FAX reception 303. The types of code processing corresponding to FAX reception 303 are JBIG, MMR (Modified Modified Read), MR (Modified Read) and MH (Modified Huffman), etc. The code processing unit 310d executes coding and decoding processing corresponding to IFAX reception 304. The types of code processing are similar to those of FAX reception.

Several concrete examples of processing will now be described.

For example, assume that a FAX receive request has been received. In this embodiment, the code processing unit 310d has been fixedly assigned (in one-to-one correspondence) to a FAX receive request. Consequently, the code-processing acquisition determination unit 309 delivers the receive data to the code processing unit 310d immediately. Since the receive data has been coded (the coding scheme depends upon that on the transmitting side), the code processing unit 310d decodes the data by the decoding scheme that corresponds to this coding scheme to thereby obtain the raw data, then codes this raw data to generate JBIG data and stores the JBIG data in the DRAM 204. This series of processing operations is brought to a conclusion by the software-implemented code processing unit. The JBIG data that has been stored is subsequently processed by the printer 302 (printing unit 206) at an appropriate timing and a printout is finally obtained.

Further, if a request for image reading by the scanner 301 has been issued, for example, the read data is delivered to the hardware-implemented code processing unit 209 via the code processing unit 310a having one-to-one correspondence to the scanner 301, the prescribed code processing is executed and the data is stored in the DRAM 204. In other words, binarized data is produced from raw data, this data is further coded to JBIG data and the JBIG data is stored in the DRAM. JBIG data is used as the storage format because this offers the best compression rate among the available code processing schemes mentioned above. Accordingly, if there is a scheme with a compression rate available that is better than that of the JBIG scheme, this scheme may be used. The data that has been stored is transmitted to a computer (not shown) connected via a network or is decoded, restored to raw data and printed out.

If a print request is issued with respect to certain data, the data (JBIG data) is read out of the DRAM 204. Code processing for decoding the JBIG data to raw data is executed via the code processing unit 310b having one-to-one correspondence to the printer 302, and print processing is executed in the printing unit 206. In the event that there is separate print data to be printed and the JBIG decoding function is being monopolized at this time, a standby state is attained until earlier processing ends. The reason for this is that in a case where a function relating to group A is finally implemented by hardware and the hardware is being monopolized for the sake of separate data processing, the standby state is allowed. However, since the software-implemented code processing units 310 have been fixedly assigned to each of the functions in group A, the functions are not made to wait by the software-implemented code processing units 310.

Further, the functions of group C are assigned and controlled dynamically. If processing requests have been issued in the following order: FAX transmission (1), IFAX transmission (1), FAX transmission (2), print job (1), for example, then, with regard to the first two, the code processing units 310e and 310f are assigned first to FAX transmission (1) and IFAX transmission (1), respectively. When this processing is completed, then FAX transmission (2) and print job (1) are processed successively by whichever of the code processing units 310e, 130f is idle.

When copying is performed, a request to read an image by the scanner 301 is issued, the read image data is delivered to the hardware-implemented code processing unit 209 via the code processing unit 310a having one-to-one correspondence to the scanner 301, the image data is subjected to JBIG coding and the coded data is stored in the DRAM 204. A print request is issued with regard to this data once it has been stored in the DRAM. The data (JBIG data) is read out of the DRAM 204, code processing for decoding the JBIG data to raw data is executed via the code processing unit 310b having one-to-one correspondence to the printer 302, and print processing is executed in the printing unit 206.

<Relationship Between Software-Implemented Code Processing Unit and Hardware-Implemented Code Processing Units>

FIG. 4 is a diagram for describing the relationship between the software-implemented code processing units 310a to 310f and hardware-implemented code processing units.

In FIG. 4, the code-processing acquisition determination unit 309 and the code processing units 310a to 310f constitute software-implemented code processing units that operate based upon software programs, as described above. A JPEG encoder/decoder chip 401, a JBIG encoder/decoder chip 402 and a binary encoder/decoder chip 403 constitute code processing units. The invention is not limited to this arrangement and other encoder/decoder chips may be included. These processing chips correspond to the code processing unit 209 shown in FIG. 2.

As shown in FIG. 4, the software-implemented code processing units 310a to 310f are connected to each of the hardware-implemented code processing units 401, 402 and 403. The solid lines indicate the relationships actually used (where data is sent and is subjected to code processing within the chips and not by software). Although the dashed lines are connected, these indicate relationships in which processing of data is brought to a conclusion solely by processing using software and not by processing within the chips.

For example, although the code processing unit 310a is provided exclusively for the scanner 301, the actual processing is executed by any of the hardware chips and not by software. The same holds true for the scanner 301 in regard to the code processing unit 310b exclusively for the printer 302. Accordingly, in a case where processing of data that has been read in by the scanner and processing of data necessary when print processing is executed conflict in the JBIG encoder/decoder chip 402 as when copying is performed, whichever processing request was earliest is processed first. It should be noted that since processing speed using hardware is must faster than that using software, waiting time is very short.

The code processing units 310c and 310d provided exclusively for group B are connected to the hardware-implemented code processing units. However, since the functions of group B are implemented only by software, the hardware-implemented code processing units are not used. Conversely, the functions of group B cannot be made to wait, as described earlier. If processing using hardware were to be executed, then a function would be made to stand by in the event of a conflict with other processing, and this could make it impossible to attain the goal of immediate response. It is for this reason that the above-described arrangement is adopted.

With regard to the functions of group C that are processed dynamically, operation is performed solely by the software-implemented code processing units with the exception of the operation relating to the print job 308. Since only the binary encoder/decoder is used in regard to the print job 308, the arrangement adopted is that shown in FIG. 4.

Thus, in this embodiment, code processing units are differentiated as those used fixedly and those used dynamically, resources used by operations executed by software-implemented code processing are utilized efficiently, and use of hardware-implemented code processing is limited based upon the attributes of various functions (a printer function and facsimile function) in a MFP apparatus. As a result, more efficient processing can be executed with fewer hardware resources.

<Operation for Assigning Software-Implemented Code Processing Units>

FIG. 5 is a flowchart for describing operation from receipt, by the code-processing acquisition determination unit 309, of requests from the functions (301 to 308) to acquire code processing units, to the end of actual code processing.

At step S501, a request to acquire a code processing unit for the purpose of executing processing corresponding to a function is issued from any of the request-source tasks (functions) 301 to 308.

Next, at step S502, the code-processing acquisition determination unit 309 receives the request for acquisition of a code processing unit from the request-source task and advances processing to the next step S503.

On the basis of a parameter (e.g., one indicating the ID of the function) contained in the request signal that has been sent from the request-source task, it is determined at step S503 whether the function of the request-source task is one that has operation priority, namely whether the function is one to which a code processing unit has been fixedly assigned. If the function is one that has operation priority, processing proceeds to step S506. If the function is one that does not have operation priority, then processing proceeds to step S504. This means that a signal processing unit has been dynamically assigned to the request-source task.

It is determined at step S504 whether dynamically assigned code processing units (310e and 310f in FIG. 3) are idle. If they are idle, processing proceeds to step S506. If they are not idle, then processing proceeds to step S505. Here the request-source task stands by until either of the code processing units becomes idle.

At step S506, the code processing unit that has been assigned receives an acquisition request from the code-processing acquisition determination unit 309 and starts initializing itself. Processing then proceeds to step S507.

At step S507 after its own initialization is completed, the code processing unit sends the code-processing acquisition determination unit 309 an acquisition OK signal, which gives notification of the fact that preparations for executing code processing (encoding or decoding) have been made in accordance with the function of the request-source task.

Next, at step S508, the code-processing acquisition determination unit 309 receives the acquisition OK signal from the corresponding code processing unit and reports it to the request-source task.

At step S509, the request-source task receives the acquisition OK signal from the code-processing acquisition determination unit 309 and recognizes that the corresponding code processing unit is capable of being used. The request-source task sends this code processing unit the data that is to undergo code processing at step S510. At this time the code-processing acquisition determination unit 309 in principle applies no particular processing to this data.

The code processing unit receives the data that has been transmitted from the request-source task at step S511 and executes code processing at step S512. The content of code processing differs depending upon the form of the data that has been transmitted. If the data is raw data, for example, it is subjected to JBIG compression. If it is data that has already been binarized, then the data is decoded and restored to raw data. If code processing has been completed with regard to all data to be processed, then processing proceeds to step S513.

At step S513, the code-processing acquisition determination unit 309 receives notification of completion of processing and the processed data from the code processing unit, transmits these to the request-source task and places itself in a standby mode to wait for the next acquisition request.

At step S514, the request-source task receives the notification of completion of processing and the processed data and stores the processed data in the DRAM 204. There are also cases where the data that has been stored is used by another task (function).

In this flowchart, the basic operation is such that after processing regarding an acquisition request of one request-source task is completed, processing is executed with regard to a request from the next request-source task. However, it may be so arranged that in a case where an acquisition request from a task that has been assigned fixedly is received during the course of processing of an acquisition request from a dynamically assigned task, then this acquisition request also is processed in parallel. The reason for this is that causing an acquisition request from a fixedly assigned task (function) to wait does not constitute the gist of the present invention. Accordingly, if an acquisition request is issued from FAX reception 303 when an acquisition request from FAX transmission 305, for example, is being processed, the operation of the code processing unit 310c fixedly assigned to FAX reception 303 is started immediately without being impeded by the processing regarding FAX transmission 305.

Thus, as described above, in an image processing apparatus having a plurality of code processing units and in which there are a plurality of request-source tasks that request these code processing units to execute processing, a state is established in which image processing based upon a receive task (FAX/IFAX reception) and image processing based upon a printing- or scanning-related task is given a high priority so that this image processing (code processing using software) can always be executed. As a result, these operations regarding high-priority functions can be assured at all times. Further, with regard to functions such as FAX and IFAX transmission that do not have an influence on overall processing even if they are made to wait a while, the image processing package is assigned dynamically so that the maximum number of operations will not be exceeded. As a result, these functions can be used efficiently without excessively burdening resources such as the memory and CPU used in the apparatus.

Thus, in an image processing apparatus having many functions, resources necessary for code processing units can be suppressed while a large-scale decline in performance is prevented.

SUMMARY

Since assuring code processing units equivalent to the maximum number of operations on a one-to-one basis is considered difficult in view of resources, it is necessary to decide the maximum number of operations performed simultaneously. The processing requesting side requests processing after acquiring code processing units dynamically. However, owing to the functions on the processing requesting side, there also exist functions (FAX, IFAX reception, etc.) for which processing must always be carried out when it is desired to execute processing. In a case where a task having such a function requires a code processing unit, the code processing unit must be capable of being acquired without fail.

Further, if, in a case where a task (the copy function, etc.) characterized by high frequency of use and by continuous operation requires a code processing unit, the code processing unit is acquired dynamically and cannot be acquired at the time, the performance of this function will decline markedly. Accordingly, even in a case where the tasks of these functions require a code processing unit, it is desired that the code processing unit always be acquirable.

Accordingly, code processing units equivalent to the maximum number of operations performed simultaneously are divided, according to function, into code processing units assigned fixedly and code processing units assigned dynamically.

Thus, a high-priority function can be placed in a state in which image processing can always be executed, and the maximum number of operations can be held to a prescribed number. Since it is necessary that these assignments be managed in unified fashion, a code-processing acquisition determination unit is provided and all function tasks that use code processing units first have the code-processing acquisition determination unit determine whether the code processing unit can be acquired or not, and processing using the code processing unit is executed only if the result of the determination is that the code processing unit can be acquired.

Other Embodiments

In the embodiment above, it is so arranged that the functions 305 to 308 to which the code processing units 310 are assigned dynamically are given these assignments basically in order of decreasing earliness of processing requests. The reason for adopting this arrangement is that if an interrupt is applied during the course of code processing, the data processed up to that point will be wasted. However, it may be so arranged that in a case where it does not matter if the data in the previous code processing is not wasted, as in the case of an emergency, the processing of another function is executed first.

The present invention includes a case where the object of the present invention can be also achieved by providing software program code to realize functions of the above-described embodiments to a computer of an apparatus or a system connected with respective devices to realize the functions of the above-described embodiments, and causing the respective devices in accordance with the program stored in the computer (CPU or MPU) of the system or the apparatus.

Further, in this case, the software program code itself realizes the functions of the above-described embodiments, and the program code itself constitutes the present invention. As a transmission medium of the program code, a communication medium (a wire circuit such as an optical fiber, a radio circuit or the like) in a computer network (a LAN, a WAN such as the Internet, a radio communication network or the like) system can be used for providing program information as a carrier wave.

Further, means for supplying the program code to the computer, for example, a recording medium holding the program code, constitutes the present invention. As such recording medium holding the program code, a flexible disk, a hard disk, an optical disk, an magneto-optical disk, a CD-ROM, a magnetic tape, a nonvolatile memory card, a ROM or the like can be used.

Further, besides the functions of the above-described embodiments are realized by executing the supplied program by a computer, the present invention includes a case where the functions of the above-described embodiments are realized with the program code in cooperation with an OS (Operating System) or other application software or the like working on the computer.

Furthermore, the present invention also includes a case where, after the supplied program code is stored in a memory of a function expansion board which is inserted into the computer or in a memory provided in a function expansion unit which is connected to the computer, a CPU or the like contained in the function expansion board or the function expansion unit performs a part or entire actual process in accordance with designations of the program code and realizes the functions of the above embodiments.

Note that the shapes and structures of the respective elements shown in the above-described embodiments are merely given as an example of implementation of the present invention, and the technical scope of the present invention is not limitedly interpreted with these shapes and structures. That is, the present invention can be implemented in various forms without departing from its sprit and its principal features.

As described above, according to the present invention, an image file with authentication data can be altered in accordance with a user's instruction.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-059232 filed on Mar. 3, 2004, the entire contents of which are hereby incorporated by reference herein.

The invention claimed is:

1. An image processing apparatus comprising:
a predetermined number of code converting units, the predetermined number of code converting units comprising at least one of a hardware implemented code converting unit and a non transitory computer readable medium, each code converting unit configured to execute coding and decoding of image data, wherein the predetermined number of code converting units includes reserved code converting units and non-reserved code converting units, such that the number of reserved code converting units is less than the number of all code converting units;
- a plurality of request-source task units, each request-source task unit configured to issue a processing request, the number of request-source task units being greater than the predetermined number of code converting units and having priorities set in advance, wherein the number of the reserved code converting units is the same as the number of request-source task units having a high priority and wherein each request-source task unit having a low priority competes for at least one of a plurality of the non-reserved code converting units, the number of non-reserved code converting units being less than the number of request-source task units having the low priority; and
- an assigning unit configured to:
  i. when the processing request is received from one of the plurality of request-source task units having the high priority at any time, always assign the reserved code converting unit to a task corresponding to the request-source task unit that issued the processing request, and
  ii. when the processing request is received from one of the plurality of request-source task units having the low priority and at least one of the plurality of non-reserved code converting units is an idle code converting unit, assign the idle code converting unit to the task corresponding to the request-source task unit that issued the processing request.

2. The apparatus according to claim 1, wherein said predetermined number of code converting units are constituted by software-implemented code converting units for executing code conversion by software and hardware-implemented code converting units for executing code conversion by hardware; and
when the processing request is received from one of the plurality of request-source units, said assigning unit assigns one of said software-implemented code converting units to the task corresponding to the request-source task unit that issued the processing request.

3. The apparatus according to claim 2, wherein said request-source task units having the high priority are classified into a first unit group processed by said software-implemented code converting units and a second unit group processed by said hardware-implemented code converting units via said software-implemented code converting units.

4. The apparatus according to claim 3, wherein said hardware-implemented code converting units are adapted so as to be used by the request-source task units of said second unit group.

5. The image processing apparatus according to claim 1, wherein when the processing request is received from one of the plurality of request-source task units having the low priority and none of the plurality of non-reserved code converting units is an idle code converting unit, the request-source task unit stands by, such that the assigning unit does not assign a code converting unit to the task corresponding to the request-source task unit until one of the plurality of non-reserved code converting units becomes an idle converting unit, regardless of whether one of the plurality of reserved code converting units is an idle code converting unit.

6. The image processing apparatus according to claim 1, wherein each request-source task unit having a high priority reserves one of the reserved code converting units before issuing the processing request.

7. An image processing method for an image processing apparatus which includes a predetermined number of code converting units including reserved code converting units and non-reserved code converting units, such that the number of reserved code converting units is less than the number of all code converting units, the method comprising:
- a processing-request issuing step of issuing a processing request from a request-source task unit of a plurality of request-source task units to perform a corresponding task, wherein the number of the reserved code converting units is the same as the number of request-source task units having a high priority, and wherein the plurality of request-source task units have priorities corresponding to respective tasks;
- a priority processing determination step of receiving the processing request and determining whether the processing request issued by the request-source task unit should be processed with priority, wherein each request-source task unit having a high priority fixedly reserves one of the reserved code converting units and wherein each request-source task unit having a low priority competes for at least one of a plurality of the non-reserved code converting units, the number of non-reserved code converting units being less than the number of request-source task units associated with a processing request having the low priority; and
- an assigning step of:
  i. when the processing request is received from one of the plurality of request-source task units having the high priority at any time, always assigning the reserved code converting unit reserved by the request-source task unit to a task corresponding to the request-source task unit that issued the request, and
  ii. when the processing request is received from one of the plurality of request-source task units having the low priority and at least one of the plurality of non-reserved code converting units is an idle code converting unit, assigning the idle code converting unit to the task corresponding to the request-source task unit that issued the request.

8. The method according to claim 7, wherein said predetermined number of code converting units are constituted by software-implemented code converting units for executing code conversion by software and hardware-implemented code converting units for executing code conversion by hardware; and
when the processing request is received from one of the plurality of request-source units, said assigning step assigns one of said software-implemented code converting units to the task corresponding to the request-source task unit that issued the request.

9. The method according to claim 8, wherein said request-source task units having the high priority are classified into a first unit group processed by said software-implemented code converting units and a second unit group processed by said hardware-implemented code converting units via said software-implemented code converting units.

10. The method according to claim 9, wherein said hardware-implemented code converting units are adapted so as to be used by the request-source task units of said second unit group.

11. A non-transitory computer-readable medium having an image processing program encoded thereon, the image processing program for controlling an image processing apparatus which includes a predetermined number of code converting units including reserved code converting units and non-reserved code converting units, such that the number of reserved code converting units is less than the number of all code converting units, the image processing program comprising:

program code for executing a processing-request issuing step of issuing a processing request from a request-source task unit of a plurality of request-source task units to perform a corresponding task, wherein the number of the reserved code converting units is the same as the number of request-source task units having a high priority, and wherein the plurality of request-source task units have priorities corresponding to respective tasks;

program code for executing a priority processing determination step of receiving the processing request and determining whether the processing request issued by the request-source task unit should be processed with priority, wherein each request-source task unit having a high priority fixedly reserves one of the reserved code converting units and wherein each request-source task unit having a low priority competes for at least one of a plurality of the non-reserved code converting units, the number of non-reserved code converting units being less than the number of request-source task units associated with a processing request having the low priority; and program code for executing an assigning step of:

i. when the processing request is received from one of the plurality of request-source task units having the high priority at any time, always assigning the reserved code converting unit reserved by the request-source task unit to a task corresponding to the request-source task unit that issued the request, and ii. when the processing request is received from one of the plurality of request-source task units having the low priority and at least one of the non-reserved code converting units is an idle code converting unit, assigning the idle code processing unit to the task corresponding to the request-source task unit that issued the request.

12. The non-transitory computer-readable medium according to claim 11, wherein said predetermined number of code converting units are constituted by software-implemented code converting units for executing code conversion by software and hardware-implemented code converting units for executing code conversion by hardware; and when the processing request is received from one of the plurality of request-source units, the program code for executing said assigning step includes code for assigning said software-implemented code converting units the task corresponding to the request-source task unit that issued the request.

13. The non-transitory computer-readable medium according to claim 12, wherein said request-source task units having the high priority are classified into a first unit group processed by said software-implemented code converting units and a second unit group processed by said hardware-implemented code converting units via said software-implemented code converting units.

* * * * *